United States Patent Office 2,805,217
Patented Sept. 3, 1957

2,805,217

TERPENE-P₄S₃-OXYGEN CONDENSATION PRODUCTS AND THEIR ESTERS AND ESTER SALTS AS LUBRICATING OIL ADDITIVES

Gerard A. Loughran, Stamford, Conn., and Edwin O. Hook, Cleveland, Ohio, assignors to American Cyanamid Company, New York, N. Y., a corporation of Maine No Drawing. Application March 9, 1955,
Serial No. 493,292

12 Claims. (Cl. 260—139)

This invention relates to a novel class of condensation products of terpenes with phosphorous sesquisulfide and oxygen, to the esters obtained by reacting these condensation products with monohydroxy organic compounds, and to metal salts of the esters so obtained. The invention includes the new compositions, as described above, methods for their preparation, and hydrocarbon lubricating oil compositions containing them as will hereinafter be more fully described.

We have found that the terpene hydrocarbons, which are acyclic, monocyclic and bicyclic hydrocarbons of the formula $C_{10}H_{16}$, can be condensed with phosphorous sesquisulfide and oxygen in definite combining ratios to form products having a composition corresponding to the empirical formula

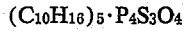
$$(C_{10}H_{16})_5 \cdot P_4S_3O_4$$

These products possess definite antioxidant and corrosion inhibiting properties when added to hydrocarbon lubricating oils in quantities of about 0.1–2% or greater, but their principal utility appears to reside in their important property of forming oil-soluble esters when reacted with up to three mols of a monohydroxy organic compound such as an aliphatic or cycloaliphatic monohydric alcohol, a monohydric phenol and the like. These esters, in turn, can be converted into their corresponding metal salts which are likewise soluble in hydrocarbon lubricating oils. The polyvalent metal salts of the esters of aliphatic and cycloaliphatic monohydric alcohols and of alkyl-substituted monocyclic phenols containing 10 or more carbon atoms possess good detergency in lubricating oils when used therein in quantities of about 0.1–3% or more, and constitute a preferred class of compositions included within the scope of our invention.

Terpene hydrocarbons can be reacted with phosphorous sesquisulfide and oxygen by heating the reagents in suitable proportions to reaction temperatures on the order of about 110°–130° C. and blowing air or oxygen through the mixture. The resulting reaction is exothermic and the heat given off maintains the mixture at reaction temperatures within the range of about 120°–150° C. without difficulty. While the reaction can be carried out in the presence of suitable solvents or diluents such as benzene, toluene, xylene, hydrocarbon lubricating oils and the like, it is much simpler and preferable to utilize an excess of terpene for this purpose, and this is the preferred procedure for use in carrying out this portion of the process of our invention. About 5 mols of terpene are combined with 1 mol of phosphorous sesquisulfide and 2 mols of oxygen during the reaction, and at least 6.5 mols of terpene should be present for each mol of $P_4S_3$ when no added diluent is present. Under these conditions the suspended phosphorous sesquisulfide disappears rapidly from the reaction mixture and an essentially clear liquid is formed during the first 2–4 hours of the reaction, but in most cases this is followed by the separation of a granular solid material. However, this solid substance is reactive with alcohols and phenols and disappears when the reaction product is subsequently esterified.

Esterification or alcoholysis of the terpene–$P_4S_3$–oxygen condensation product is carried out simply by adding the desired alcohol and heating the mixture at esterification temperatures of about 100°–160° C. for suitable periods of time. No added solvent is necessary, but with the more volatile alcohols and phenols it is preferable to employ an excess of the alcoholic reagent to keep the reaction mixture in a more fluid condition. With higher aliphatic monohydric alcohols such as those of 10–18 carbon atoms and higher it is sometimes desirable to add a more volatile solvent such as toluene instead of using excess alcohol, since this simplifies the subsequent stripping operation. Up to 3 mols of a monohydric alcohol or phenol can be combined in this manner with 1 mol of the terpene-$P_4S_3$-oxygen condensation product; the resulting esters are clear, viscous oils which are soluble in hydrocarbon lubricating oil and possess good antioxidant and anti-corrosion properties.

Any desired monohydric alcohol can be esterified with the terpene-phosphorous sesquisulfide-oxygen condensation products by this procedure. Lower aliphatic alcohols such as methanol, ethanol, propanol or isopropanol or any of the isomeric butanols or pentanols may be used as well as the alcohols of 6–9 carbon atoms obtained by the catalytic hydrogenation of oxides of carbon and described, for example, in U. S. Patent No. 2,368,000. In the preparation of antioxidants and detergents for lubricating oils we prefer to use the aliphatic alcohols of 10–18 carbon atoms such as n-decanol, n-dodecanol, mixtures of higher straight chain primary alcohols of 8 to 14 carbon atoms obtained by the reduction of coconut oil fatty acids and their esters, octadecanol-1 and mixtures of saturated and unsaturated higher aliphatic alcohols obtainable by the reduction of fatty acids of tall oil, cotton seed oil and the like. Monocyclic phenols containing a single hydroxy group such as phenol itself, cresols, xylenols and the like may also be used, but for use in lubricating oils we prefer to employ the alkylphenols of 10–18 carbon atoms or more obtained by condensing phenol or cresol with butenes, hexenes, polypropylenes, polybutylenes and the like. Alicyclic monohydric alcohols of comparable molecular weight, such as those obtained by hydrogenating the above and similar monohydric phenols may likewise be used. As has been stated, at least 3 mols of one or more of these alcohols, either singly or in admixture, should be used for each mol of the terpene condensation product.

Formation of the salts is carried out simply by mixing the ester with the requisite quantity of a hydroxide, carbonate, bicarbonate or other basic compound of the desired metal. While the alkali metal salts of the esters can be prepared in this manner, the preferred compounds of our invention are the salts of polyvalent metals such as aluminum, calcium barium, strontium, magnesium, zinc, tin, lead and mercury and for use in lubricating oils the salts of calcium, barium and zinc are preferred. Preferably the salt formation is carried out in the presence of a solvent, which may be a volatile hydrocarbon such as benzene or toluene or a relatively non-volatile solvent such as lubricating oil. In many cases the salt formation is facilitated by the presence of water in admixture with the solvent; this water, as well as the water formed by the salt formation and any other volatile materials present, is preferably stripped from the salt before it is used in a lubricating oil. Three molecular equivalents of a divalent metal hydroxide such as calcium hydroxide should be used for each two mols of the terpene-$P_4S_3O_4$ condensation product as the latter acts as a trivalent radical in the salt formation.

It will be understood that any desired terpene may be reacted with phosphorous sesquisulfide and oxygen by the process of our invention to form starting materials for the preparation of the esters and ester salts described above. Monocyclic terpene hydrocarbons such as limonene or dipentene, terpinene, phellandrene and the like may be used as well as olefinic terpenes such as myrcene, ocimene and terpene-forming materials such as isoprene, but we prefer to employ the bicyclic terpenes such as alpha-pinene and beta-pinene because of their greater availability and cheapness. Examination of the hydrocarbons stripped from the products of condensation of a variety of the above-named terpenes with $P_4S_3$ and oxygen indicates that the endo-bridge of a bicyclic terpene is broken during the reaction, so that the same type of condensation products is obtained in all cases. All of the terpene hydrocarbons condense with phosphorous sesquisulfide and oxygen in the combining ratio of about 5 mols of terpene for each mol of $P_4S_3$.

Examination of the condensation products indicates that the oxygen introduced during the reaction is combined directly with phosphorous, and this is confirmed by measuring the amount of oxygen absorbed in a typical preparation. Additional confirmation was also obtained by first oxidizing the phosphorous sesqisulfide with air. For this purpose 22 grams of recrystallized phosphorous sesquisulfide was dissolved in 225 cc. of hot orthodichlorbenzene and the solution was heated to 130° C. on an oil bath in a reactor attached to an oxygen analyzer. Dry air was bubbled through at the rate of 200 cc. per minute for a total of 93 hours and the quantity of oxygen absorbed was measured. The results obtained showed that one mol of $P_4S_3$ absorbed 1.85 mols or 3.70 gram atoms of oxygen, indicating that the oxidation product was a material of the formula $P_4S_3O_4$. When this oxidized material was heated at 130° C. with excess alpha-pinene for 6 hours a condensation product was obtained similar in all respects to those produced by blowing air through a mixture of $P_4S_3$ and terpene at the same temperature, indicating that the condensation products can be prepared by first oxidizing the phosphorous sesquisulfide if desired.

The esters and salts of our invention are employed in lubricating oil compositions in amounts of about 0.1–3% or more as antioxidants and detergents. They can be used as the only antioxidant or detergent in the oil, but for most purposes they are preferably employed in compounded oils in admixture with other additives. For example, the barium, calcium and magnesium salts of the esters of aliphatic alcohols and phenols of 10 or more carbon atoms are preferably used as detergents in hydrocarbon oils which also contain an antioxidant such as 2,2'-methylene bis-(4-methyl-6-tertiary butylphenol), zinc dialkyldithiophosphates, 2,4-dialkylphenol sulfides and their calcium and barium salts and the like. These antioxidants are also preferably employed in quantities of about 0.1–3%, and preferably 0.5–1.5%, based on the weight of the oil.

The invention will be further described and illustrated by the following specific examples. It should be understood, however, that while these examples may describe in detail a number of compounds falling within the scope of the invention and their methods of preparation, they are given primarily for illustrative purposes and the invention in its broader aspects is not limited thereto.

Example 1

A mixture of 166 grams (0.754 mol) of technical phosphorous sesquisulfide and 1088 grams (8 mols) of alpha-pinene was charged into a reaction flask fitted with a reflux condenser, a stirrer and a tube for the injection of air and heated with agitation to 120° C. Air was then injected at the rate of about one liter per minute and this was continued for four hours while maintaining the temperature between 120° C. and 130° C. The $P_4S_3$ dissolved completely after this time and the reaction mixture became a clear liquid but toward the end of the reaction a greenish yellow solid began to separate out. The amount of this material was about 12–15% of the weight of the reaction mixture.

The reaction product, weighing 1259 grams, was divided into two portions. The first of these, weighing 628 grams, was mixed with 300 grams of SAE–30 hydrocarbon oil, stripped under reduced pressure at 135° C. and filtered at room temperature. The filter cake, which was the yellow solid mentioned above, was washed with heptane and dried; its dry weight was 173 grams. A sample melted with decomposition over the range of 80°–150° C.; analysis showed a content of 48.91 carbon, 7.52% hydrogen, 13.9% phosphorous and 9.03% sulfur.

Another portion of the product weighing 500 grams was stripped at 0.5 mm. of mercury pressure to yield 347 grams of pinene-$P_4S_3O_4$ condensation product. This was esterified with 148 grams (2 mols) of n-butanol by heating the mixture for 2¾ hours at 120°–140° C. The esterification proceeded smoothly and all of the yellow solid originally present in the terpene condensation product disappeared during the reaction. The resulting tributyl ester, after stripping, was a clear viscous oil.

Example 2

A mixture of 66 grams (0.3 mol) of phosphorous sesquisulfide and 272 grams (2 mols) of beta-pinene was reacted at 130°–140° C. for 8 hours by injecting air as described in Example 1. The reaction mixture became a clear liquid after about 4–5 hours and then became cloudy by the precipitation of a yellow-green granular solid. It was evident that the course of the reaction and the type of product obtained with beta-pinene was the same as with alpha-pinene as described in Example 1.

The reaction product was esterified by adding 244 grams (0.9 mol) of octadecanol and heating for 6 hours at 120°–140° C. The ester, weighing 742 grams, was converted into the calcium salt by stirring with a suspension of 107 grams of $Ca(OH)_2$ in a mixture of 400 grams of SAE–10 hydrocarbon lubricating oil and 50 cc. of water followed by stripping at 150° C. under 0.1 mm. of mercury pressure. An additional 100 grams of oil was then added to produce 1000 grams of a lubricating oil additive concentrate. Analysis of the salt showed a content of 2.20% calcium, 3.10% phosphorous and 2.20% sulfur.

A sample of this product was tested in lubricating oil at a concentration of 0.75% of the metal salt by the 100-hour Lauson engine test described in Example 3. Ratings of 4.6 were obtained both for the ring belt and for overall cleanliness, indicating good detergency in the oil.

Example 3

A terpene-$P_4S_3O_4$ condensation product was prepared from 0.377 mol of $P_4S_3$ and 8 mols of alpha-pinene followed by stripping as described in Example 1. The condensation product, weighing 676 grams, was esterified by adding 270 grams (1 mol) of n-octadecanol and heating the mixture at 150° C. for 1½ hours. The ester was a clear viscous oil weighing 939 grams.

This ester was converted into the barium salt by adding it to a suspension of 316 grams (1 mol) of $$Ba(OH)_2 \cdot 8H_2O$$

in 233 grams of SAE–10 hydrocarbon lubricating oil. An additional 299 grams of the same oil was then added and the water was stripped off under vacuum; the resulting concentrate weighed 1281 grams.

This concentrate was added to lubricating oil in an amount sufficient to incorporate 0.75% by weight of the addition and the oil was used in a 100 hour Lauson engine test under SAE standard operating conditions with 0.65% of zinc dihexyl dithiophosphate as the oxidation inhibitor. The engine was then dismantled and ratings were made on a scale in which 5 represents complete cleanliness, 4.5 and up is from very good to excellent and 4 to 4.5 is from fair to good. The ring belt rating was 4.7 and the rating for overall cleanliness was 4.6.

*Example 4*

A terpene-P₄S₃O₄ condensation product was prepared by heating 83 grams of $P_4S_3$ and 544 grams (4 mols) of alpha-pinene for 3 hours at 120°–131° C. with injection of air by the procedure described in Example 1. The product was esterified with 270 grams of n-octadecanol by heating at 140–150° C. for 2 hours and the ester was stirred with a suspension of 92 grams of $Ca(OH)_2$ in 540 grams of lubricating oil to form the calcium salt. After stripping under reduced pressure at 135° C. a clear dark green concentrate was obtained. The salt contained 2.30% of calcium, 3.20% of phosphorous and 1.80% of sulfur. This material when tested in the Lauson engine at 0.75% concentration as described in Example 3 resulted in a rating of 4.5 both for the ring belt and for overall cleanliness.

*Example 5*

A mixture of 1088 grams of alpha-pinene and 166 grams of $P_4S_3$ was reacted with air at 120°–130° C. for 3½ hours and stripped as described in Example 1. A portion of the product weighing 232 grams was heated with 158 grams (1 mol) of n-decanol for 2 hours at 135°–155° C. and the excess alcohol removed by stripping. The resulting ester, weighing 464 grams, was converted into a barium salt by agitation with 395 grams of $Ba(OH)_2 \cdot 8H_2O$ in 523 grams of oil followed by dehydration at 135° C. and 0.35 mm. of mercury pressure and the oil was filtered. Lauson engine tests resulted in ratings of 4.3 for ring belt and overall cleanliness.

Another portion of the condensation product weighing 650 grams was esterified with 127 grams of methylisobutyl carbinol and converted into the calcium salt by stirring with 88 grams of $Ca(OH)_2$ in 300 grams of lubricating oil containing 80 cc. of water. The product was stripped of water and excess terpenes by heating at 130°–140° C. under vacuum, yielding 819 grams of a product which was diluted with an additional 219 grams of oil and filtered. The product was a clear brown oil which exhibited fair detergency in Lauson engine tests, the ring belt rating being 4.0 and the overall rating being 3.7.

Another 232 gram portion of the condensation product was esterified with 270 grams of n-octadecanol by heating at about 145° C. for 2 hours and the ester was added to a suspension of 124 grams of zinc hydroxide in a mixture of 300 cc. of toluene, 50 cc. of water and 485 grams of SAE–10 oil and agitated until the salt formation was complete. The toluene, water and unreacted terpene were stripped off at 0.6 mm. of mercury pressure resulting in a clear brown concentrate.

This product was dissolved in lubricating oil in an amount sufficient to obtain a concentration of 0.5% of the additive and the oil was tested against strips of copper-lead bearing material by the standard Underwood oxidation test. After 10 hours the bearing loss was 0.024 gram.

*Example 6*

A condensation product of 840 grams (2.5 mols) of alpha-pinene with 83 grams of $P_4S_3$, prepared by injecting air at 125°–139° C. for 3¼ hours by the procedure of Example 1, was mixed with 281 grams (1.1 mols) of a commercial mixture containing 45% by weight of cetyl alcohol and 55% of oleyl alcohol. The mixture was esterified by heating for one hour at 130° C. resulting in 725 grams of a clear viscous oil.

This ester was added to a suspension of 100 grams (1.35 mols) of $Ca(OH)_2$ in a mixture of 300 grams of SAE–10 oil and 100 grams of water and agitated until salt formation was complete. The mixture was stripped of water and unreacted terpene and 2605 grams of a clear light brown concentrate were obtained.

This product was an excellent detergent in lubricating oil. Lauson engine tests at 0.75% concentration as described in Example 3 resulted in an overall rating of 4.8 and a ring belt rating of 4.9.

*Example 7*

A condensation product of 66 grams of $P_4S_3$ and 272 grams of dipentene was prepared with injection of air by the procedure of Example 2 and esterified with 243 grams of octadecanol by heating for 4 hours at 120° C. The ester, weighing 573 grams, was added to a suspension of 142 grams of $Ca(OH)_2$ in 400 grams of SAE–10 oil containing 50 cc. of water and stirred until salt formation was complete. The product was stripped, diluted with additional oil and filtered, yielding 1166 grams of concentrate. A sample of the salt analyzed 2% calcium, 2.50% phosphorous and 2.30% sulfur. A Lauson engine test at 0.75% concentration as described in Example 3 resulted in an overall rating of 4.7 and also a rating of 4.7 for the ring belt.

*Example 8*

A mixture of 66 grams of $P_4S_3$ and 272 grams of alpha-pinene was heated at 130°–140° C. for 6½ hours with injection of oxygen as described in Example 1 and the product was esterified with a commercial nonylphenol produced by condensing phenol with tripropylene. The esterification was carried out by adding 198 grams (0.9 mol) of the phenol to the unstripped terpene condensation product and heating the mixture at 130°–140° C. for 4 hours. The product, weighing 540 grams, was added to a suspension of 74 grams of $Ca(OH)_2$ in a mixture of 200 grams of SAE–10 hydrocarbon oil and 50 grams of water and stirring until salt formation was complete.

The product was dehydrated and stripped by heating to 160° C. under 0.1 mm. of mercury pressure and further diluted with 137 grams of oil. After filtering the concentrate weighed 1074 grams.

Lauson engine tests on this product at 0.75% concentration with 0.65% of zinc dihexyl dithiophosphate gave rather poor results caused by reaction of the inhibitor and detergent in the oil. This difficulty was overcome, however, by substituting 0.5% of 2,2'-methylene-bis-(4-methyl-6-tertiary butylphenol) as a non-metallic inhibitor and ratings of 4.4 for the ring belt and 4.5 for overall cleanliness were finally obtained.

What we claim is:

1. Triesters obtained by heating five mols of a cyclic terpene hydrocarbon with one mol of phosphorous sesquisulfide and two mols of oxygen at about 110°–150° C. and esterfying the product with three mols of a member of the group consisting of monohydric alkanols of from 4 to 18 carbon atoms and nonylphenol.

2. A member of the group consisting of the calcium, barium and zinc salts of the esters defined by claim 1.

3. Triesters obtained by heating five mols of a cyclic terpene hydrocarbon with one mol of phosphorous sesquisulfide and two mols of oxygen at about 110°–150° C. an desterifying the product with three mols of an monohydric alkanol of from 4 to 18 carbon atoms.

4. A member of the group consisting of the calcium, barium and zinc salts of the esters defined by claim 3.

5. Triesters obtained by heating five mols of a pinene hydrocarbon with one mol of phosphorous sesquisulfide and two mols of oxygen at about 110°–150° C. and esterifying the product with three mols of a member of the group consisting of monohydric alkanols of from 4 to 18 carbon atoms and nonylphenol.

6. A member of the group consisting of the calcium, barium and zinc salts of the esters defined by claim 5.

7. The condensation product obtained by heating at least five mols of a cyclic terpene hydrocarbon with one mol of phosphorous sesquisulfide and two mols of oxygen at about 110°–150° C.

8. The condensation product obtained by heating at least five mols of a pinene hydrocarbon with one mol of phosphorous sesquisulfide and two mols of oxygen at about 110°–150° C.

9. A method of producing a terpene-phosphorous sesquisulfide-oxygen condensation product corresponding to the empirical formula $$(C_{10}H_{16})_5 \cdot P_4S_3O_4$$

which comprises heating together at about 110°–150° C. a mixture of at least 5 mols of a cyclic terpene hydrocarbon and one mol of phosphorous sesquisulfide and simultaneously injecting a free oxygen-containing gas into the mixture.

10. A method according to claim 9 in which the oxygen-containing gas is air.

11. A method of producing a triester of a terpene-phosphorous sesquisulfide-oxygen condensation product which comprises heating at about 100°–160° C. one combining proportion of the product obtained by reacting at about 110°–150° C. five mols of a cyclic terpene hydrocarbon with one mol of phosphorous sesquisulfide and two mols of oxygen together with at least three mols of a member of the group consisting of monohydric alkanols of from 4 to 18 carbon atoms and nonylphenol.

12. A method of producing a polyvalent metal salt of a terpene-phosphorous sesquisulfide-oxygen ester which comprises adding an ester of a cyclic terpene hydrocarbon-phosphorous sesquisulfide-oxygen condensation product to a suspension of a polyvalent metal hydroxide in an organic solvent, agitating the mixture to form a salt, and removing the water formed by the reaction.

References Cited in the file of this patent
UNITED STATES PATENTS

| | | |
|---|---|---|
| 2,483,571 | Brennan et al. | Oct. 4, 1949 |
| 2,619,482 | Beare | Nov. 25, 1952 |
| 2,662,856 | Bishop | Dec. 15, 1953 |
| 2,712,528 | Hill | July 5, 1955 |